United States Patent
Ho et al.

(10) Patent No.: US 10,068,571 B2
(45) Date of Patent: Sep. 4, 2018

(54) VOICE CONTROL METHOD AND VOICE CONTROL SYSTEM

(71) Applicant: Acer Incorporated, New Taipei (TW)

(72) Inventors: Andy Ho, New Taipei (TW); Yin-Hsong Hsu, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 15/264,418

(22) Filed: Sep. 13, 2016

(65) Prior Publication Data

US 2017/0133012 A1   May 11, 2017

(30) Foreign Application Priority Data

Nov. 5, 2015 (TW) .............................. 104136559 A

(51) Int. Cl.
*G10L 17/22* (2013.01)
*G10L 15/22* (2006.01)
*H04L 29/08* (2006.01)
*G10L 17/06* (2013.01)
*G10L 17/04* (2013.01)
*H04W 12/08* (2009.01)

(52) U.S. Cl.
CPC .............. *G10L 15/22* (2013.01); *G10L 17/04* (2013.01); *G10L 17/06* (2013.01); *G10L 17/22* (2013.01); *H04L 67/025* (2013.01); *H04W 12/08* (2013.01); *G10L 2015/223* (2013.01); *G10L 2015/226* (2013.01)

(58) Field of Classification Search
CPC ...................... G10L 15/00; G10L 17/00; G10L 17/27–17/20
See application file for complete search history.

(56) References Cited

U.S. PATENT DOCUMENTS

| 2003/0185358 A1* | 10/2003 | Sakamoto | G10L 15/26 379/102.01 |
| 2005/0275505 A1* | 12/2005 | Himmelstein | G10L 17/22 340/5.8 |
| 2010/0088100 A1* | 4/2010 | Lindahl | G10L 15/30 704/270.1 |
| 2011/0125503 A1* | 5/2011 | Dong | G10L 15/22 704/275 |

(Continued)

FOREIGN PATENT DOCUMENTS

| CN | 102945669 | 2/2013 |
| CN | 104090559 | 10/2014 |
| TW | 201349004 | 12/2013 |

*Primary Examiner* — Pierre-Louis Desir
*Assistant Examiner* — Yi-Sheng Wang
(74) *Attorney, Agent, or Firm* — J.C. Patents

(57) ABSTRACT

A voice control method and a voice control system are provided. The voice control method is adapted to a voice control apparatus connected to a local area network. The voice control method includes following steps. Voice data is received. A voice recognition is executed for the voice data to obtain voice print information and a prompt command corresponding to the voice data. Permission information corresponding to the voice print information is determined according to the voice print information and the prompt command. At least one electronic apparatus is controlled through the local area network according to at least one of the permission information, the prompt command and environment information.

11 Claims, 6 Drawing Sheets

(56) References Cited

U.S. PATENT DOCUMENTS

2012/0173574 A1\* 7/2012 Homma ............ G06F 17/30749
707/772
2015/0019222 A1 1/2015 Zhang
2015/0095028 A1\* 4/2015 Karpey .................. G10L 17/26
704/246

\* cited by examiner

VOICE CONTROL METHOD AND VOICE CONTROL SYSTEM

CROSS-REFERENCE TO RELATED APPLICATION

This application claims the priority benefit of Taiwan application serial no. 104136559, filed on Nov. 5, 2015. The entirety of the above-mentioned patent application is hereby incorporated by reference herein and made a part of this specification.

BACKGROUND OF THE INVENTION

Field of the Invention

The invention relates to a voice control method, and particularly relates to a voice control method optimizing both of operation convenience and security and a voice control system thereof.

Description of Related Art

Currently, operating systems in the market are often provided with a personal voice assistant system. Controlling other apparatus by voice control has become increasingly popular since the personal voice assistant system may provide voice control with features of humanized and simple operations in addition to responding function. For example, various smart home services or the Internet of things are provided with a voice control function.

However, most of control devices in the market only focus on integration of sensing and monitoring devices without considering security. Taking the smart home service as an example, the conventional technique is only to recognize a voice content of a speaker, such that any one can use the control device to operate smart home appliances. Therefore, children may misuse dangerous electrical appliances, and even strangers may arbitrarily use the smart home appliances, which severely influences home security.

SUMMARY OF THE INVENTION

The invention is directed to a voice control method and a voice control system, by which an access permission of a user is set, and the access permission is adjusted or an operation mode to be executed may be determined according to a usage scenario, so as to optimize operation convenience and security of a smart home service.

The invention provides a voice control method, which is adapted to a voice control apparatus connected to a local area network. The voice control method includes following steps. Voice data is received. A voice recognition is executed for the voice data to obtain voice print information and a prompt command corresponding to the voice data. Permission information corresponding to the voice print information is determined according to the voice print information and the prompt command. At least one electronic apparatus is controlled through the local area network according to at least one of the permission information, the prompt command and environment information.

The invention provides a voice control system including at least one electronic apparatus and a voice control apparatus. The electronic apparatus includes a first communication unit connected to a local area network. The voice control apparatus includes a second communication unit, a storage unit and a processing unit. The second communication unit is connected to the local area network. The storage unit records a plurality of modules. The processing unit is coupled to the second communication unit and the storage unit, and is configured to access and execute the modules recorded in the storage unit. The modules include a voice communication module, a voice assistant module, a permission setting module and a control module. The voice communication module receives voice data. The voice assistant module executes a voice recognition for the voice data to obtain voice print information and a prompt command corresponding to the voice data. The permission setting module determines permission information corresponding to the voice print information according to the voice print information and the prompt command. The control module controls the electronic apparatus through the local area network according to at least one of the permission information, the prompt command and environment information.

Based on the above, in the embodiments of the invention, the voice print recognition is used to recognize whether a user is a legitimate user, and the access permission in different levels may be set to the legitimate user. Moreover, the prompt command and/or the environment information may be used to adjust the access permission and determine a current usage scenario, so as to decide a voice control function provided by the voice control apparatus or an operation mode automatically executed by the voice control apparatus. In this way, both of the operation convenience and security of the smart home service are optimized.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
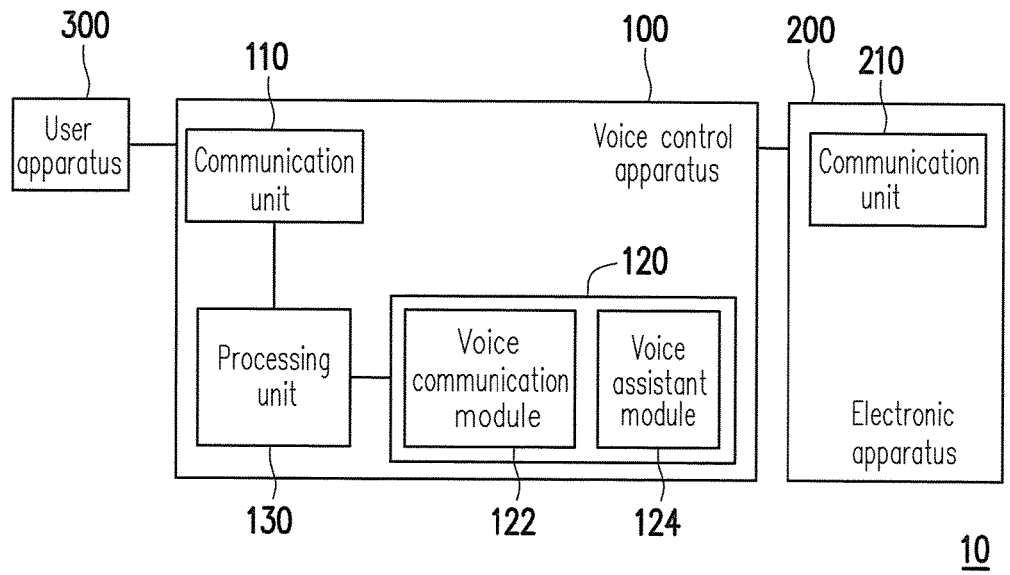
FIG. 1 is a block diagram illustrating a voice control system according to one embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In the embodiments of the invention, voice print information is adopted to recognize user's identity, and an access permission of the user and a usage scenario may be determined based on the access permission, a user state (for example, location information included in a prompt command) and environment information. In this way, besides determining the permission of the user for voice control, the embodiments of the invention are also capable of further limiting the voice control function provided by a voice control apparatus under a specific usage scenario, or even allowing the voice control apparatus to automatically execute a specific operation mode, so as to effectively improve security of a smart home service and maintain a characteristic of operation convenience of the smart home service. In addition, the embodiments of the invention may provide a remote voice control function, by which a voice over Internet protocol (VoIP) technology is adopted to bridge voice data received through the Internet to a voice assistant, such that a voice interaction between the voice control apparatus and the user at remote end is realized, so as to control other smart home appliances in the smart home service from the remote end.

In the following embodiments, FIG. 1 to FIG. 4 are used to describe the part of the remote voice control function, and FIG. 5 to FIG. 8 are used to describe the control setting for safety issue consideration.

FIG. 1 is a block diagram illustrating a voice control system according to one embodiment of the invention. Referring to FIG. 1, a voice control system 10 of the present embodiment includes a voice control apparatus 100, at least one electronic apparatus 200 and a user apparatus 300. For clarity of the description, only one electronic apparatus 200 is illustrated in FIG. 1. The voice control apparatus 100 is, for example, an electronic apparatus with capabilities of basic network connection and computation, such as a desktop computer, a notebook computer or the like. Further, the electronic apparatus 200 is, for example, a smart home appliance apparatus (e.g., a smart television, a smart lamp, a projector, etc.) or other electronic apparatuses. The user apparatus 300 is, for example, an electronic apparatus such as a desktop computer, a notebook computer or the like, or may also be a mobile apparatus such as a tablet computer, a smart phone or the like. The voice control apparatus 100 is capable of receiving voice data sent by the user apparatus 300 through the Internet and connecting to the electronic apparatus 200 through a local area network. In other words, the user apparatus 300 may receive a voice signal of a user and directly transmit the voice signal to the voice control apparatus 100 through the Internet, so as to remotely execute a voice control function of the voice control apparatus 100.

It is worth mentioning that, in the embodiments of the invention, the voice control apparatus 100 is disposed in a private network (e.g., the local area network, such as a home network) and served as a server in the private network, for example. Accordingly, in comparison with a server normally disposed in an external network, the embodiments of the invention may prevent problems including invasions or improper operations from external apparatuses.

Specifically, the voice control apparatus 100 includes a communication unit 110, a storage unit 120 and a processing unit 130. The communication unit 110 is, for example, a wired network interface card or a wireless network interface card supporting communication protocols such as institute of electrical and electronics engineers (IEEE) 802.11b/g/n, or a network communication module supporting other network protocol, which may be used to transmit data or receive data through a network. In the present embodiment, the communication unit 110 may be used to connect to the Internet so that the voice control apparatus 100 may transmit data to the user apparatus 300 through the Internet and receive data from the user apparatus 300 through the Internet. In addition, the communication unit 110 may also connect to the local area network so that the voice control apparatus 100 may control the electronic apparatus 200 in the same local area network (e.g., the smart home appliance apparatuses in the smart home belonging to the same home network) through the local area network.

The storage unit 120 may be various non-volatile memories or a combination thereof, such as Read-Only Memory (ROM) and/or a flash memory. In addition, the storage unit 120 may also include a storage device or a combination thereof, such as a hard drive, an optical drive or an external storage device (e.g., a memory card, a flash drive, etc.), but the implementation of the storage unit 120 is not particularly limited in the invention. In the present embodiment, the storage unit 120 is configured to record a voice communication module 122 and a voice assistant module 124. These modules are, for example, programs stored in the storage unit 120, which may be loaded by the processing unit 130 of the voice control apparatus 100, so that the processing unit 130 may execute functions of receiving voice, recognizing and controlling. It should be noted that, in the present embodiment, the storage unit 120 is not limited to be one single memory device Said modules may also be stored separately in two or more of memory devices of the same or different types.

Further, the storage unit 120 may also include a voice database (not illustrated) and may optionally include a voice print database (not illustrated). The voice database is configured to record a plurality of preset audio signals, which may correspond to, for example, a plurality of words or sound sequences. The voice print database is configured to record a plurality of preset voice prints, and the preset voice prints may correspond to different users, respectively. In brief, each of the users corresponding to the preset voice prints may be regarded as the legitimate user who has a permission to access the voice control apparatus 100.

The processing unit 130 is, for example, a central processing unit or other programmable devices for general purpose or special purpose such as a microprocessor and a digital signal processor (DSP), a programmable controller, an application specific integrated circuits (ASIC), a programmable logic device (PLD) or other similar devices or a combination of above-mentioned devices. The processing unit 130 is coupled to the communication unit 110 and the storage unit 120 and configured to access and execute the modules recoded in the storage unit 120 and control overall operation of the voice control apparatus 100 in order to realize the voice control method of the present embodiment. In the present embodiment, the processing unit 130 is not limited to be only one single processing device, and two or more processing devices may also be used for execution together.

The electronic apparatus 200 includes a communication unit 210. The communication unit 210 is, for example, a wired network interface card or a wireless network interface card supporting communication protocols such as institute of electrical and electronics engineers (IEEE) 802.11b/g/n or a network communication module supporting other network protocols, which may be used to transmit data or receive data through a network. In the present embodiment, the communication unit 210 may connect to the local area network for allowing the electronic apparatus 200 to receive a control command from the voice control apparatus 100, so that the electronic apparatus 200 may execute the corresponding operation according to the control command.

In addition, the electronic apparatus 200 may also include a storage unit (not illustrated) and a processing unit (not illustrated). Herein, the storage unit of the electronic apparatus 200 may be, for example, various non-volatile memories or a combination thereof such as Read-Only Memory (ROM) and/or a flash memory, or may be a storage device or a combination thereof such as a hard drive, an optical drive or an external storage device (e.g., a memory card, a flash drive, etc.), which may be used to store the received control command. The processing unit of the electronic apparatus 200 is, for example, a central processing unit or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices, which may be used to control overall operation of the electronic apparatus 200.

Figure 2:
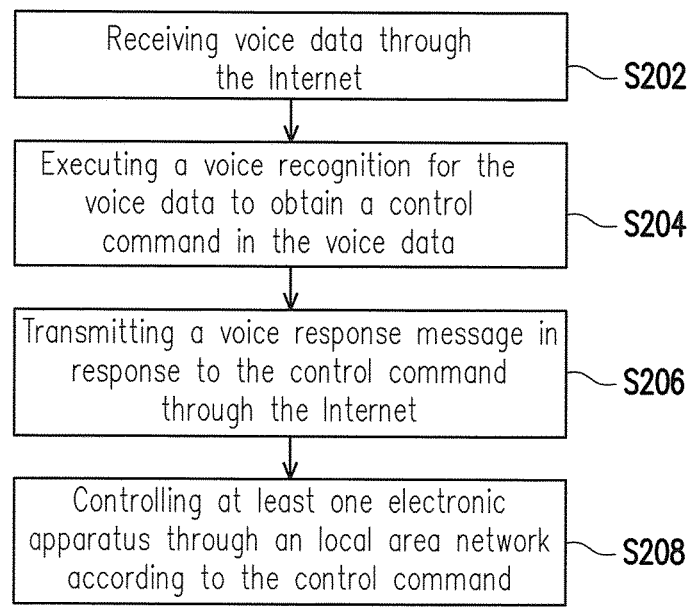
FIG. 2 is a flowchart illustrating a voice control method according to one embodiment of the invention.

FIG. 2 is a flowchart illustrating a voice control method according to one embodiment of the invention, which is adapted to the voice control system 10 of FIG. 1. Detailed steps in the method of the present embodiment are described below with reference to each element of the voice control system 10 depicted in FIG. 1.

Referring to FIG. 1 and FIG. 2, in step S202, the voice communication module 122 receives voice data through the Internet. The voice data is, for example, voice data based on VOIP, which is also a digitized voice signal.

The voice communication module 122 receives the voice data sent by the user apparatus 300 through the Internet, for example. In an embodiment, the voice communication module 122 is, for example, a VoIP application such as Skype, Line and the like. Therefore, in case the voice control apparatus 100 and the user apparatus 300 both execute the VoIP application, when the user at remote end operates the user apparatus 300 to establish communication with the voice control apparatus 100 through VoIP, the voice signal sent by the user may be converted into the voice data based on VoIP through the VoIP application on the user apparatus 300 and transmitted to the voice communication module 122. From another perspective, the voice control apparatus 100 of the present embodiment may receive the voice data through the application.

In step S204, the voice assistant module 124 executes a voice recognition for the voice data to obtain a control command to the voice data. Specifically, the voice assistant module 124 includes, for example, a voice recognizer having functions of voice recognition and analysis. In the present embodiment, the voice assistant module 124 may compare whether the voice data matches at least one of preset audio signals in the voice database. If a comparison result of the above is yes, the voice assistant module 124 may regard the preset audio signal matching the voice data as the control command. More specifically, the preset audio signals may correspond to an acoustic model and/or a language model. The acoustic model is, for example, a combination of minimum units (e.g., KK phonetics, phonetic symbols, etc.) in one or more pronunciations. The language model is, for example, a regular syntactic rule of a specific language (e.g., English, Chinese, etc.). Therefore, the voice assistant module 124 may extract an acoustic characteristic from the voice data, and compare the acoustic characteristic with the acoustic models and the language models included in the voice database, so as to determine the word or syllable corresponding to the voice data in order to obtain the control command in the voice data.

In the present embodiment, the voice assistant module 124 recognizes the voice data by using one single voice database, for example. In another embodiment, the voice assistant module 124 may establish different voice databases corresponding to different users, respectively, so that the voice database corresponding to one specific user may be used to recognize the voice data of that specific user. Under such structure, the voice assistant module 124 may further optimize the voice recognition for the specific user by a learning mechanism. Details regarding the above will be described later in the subsequent embodiments.

Further, in other embodiments, the voice assistant module 124 may also be connected to a cloud server through the Internet. The voice assistant module 124 may communicate with the cloud server, so as process the control command with assistance of the cloud server in case the control command may only be processed by connecting to the Internet.

Then, in step S206, the voice communication module 122 transmits a voice response message in response to the control command through the Internet. In step S208, the voice assistant module 124 controls the electronic apparatus 200 through the local area network according to the control command. The voice response message is, for example, generated by the voice assistant module 124 according to the control command, and the voice response message transmitted back to the user apparatus 300 by the voice communication module 122 thereafter. In other words, a data format of the voice response message may be identical to that of the voice data. In the present embodiment, the voice response message may also be, for example, a data format based on VoIP.

Accordingly, after receiving the voice response message, the user apparatus 300 may directly convert the voice response message based on VoIP into a voice signal in analog form to be outputted through a voice output unit (e.g., a speaker), so as to present a voice recognition result regarding the control command or control information regarding the electronic apparatus 200 to the user at remote end. Alternatively, the user apparatus 300 may also present the voice recognition result or the related control information in a manner of text by using a display unit (e.g., a screen). Aforementioned method of presenting the voice response message to the user apparatus 300 may be determined according to practical requirements, which are not particularly limited by the invention.

Accordingly, in the present embodiment, the voice data and the voice response message transmitted between the user apparatus 300 and the voice control apparatus 100 through VoIP technology allows the user to remotely control the voice assistant module 124 of the voice control apparatus 100 through the user apparatus 300, so as to realize a voice interaction between the voice control apparatus 100 and the user apparatus 300 at remote end.

On the other hand, the voice control apparatus 100 and the electronic apparatus 200 may be connected to the same local area network through the communication unit 110 and the communication unit 210, respectively. Therefore, after the control command in the voice data is obtained by the voice assistant module 124, the electronic apparatus 200 may also be controlled through the local area network accordingly, so that the electronic apparatus 200 may execute actions corresponding to the control command. Accordingly, the user at remote end is able to control the home appliances in the smart home service by voice control.

Figure 3:
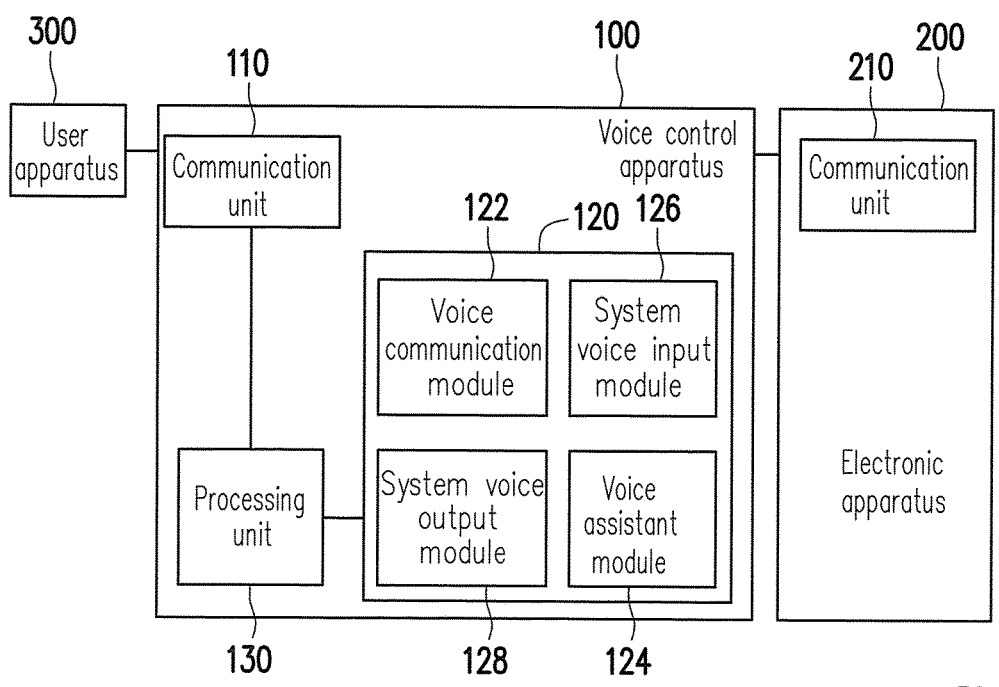
FIG. 3 is a block diagram illustrating a voice control system according to one embodiment of the invention.

FIG. 3 is a block diagram illustrating a voice control system according to one embodiment of the invention, which illustrates a detailed structure of the voice control apparatus 100. Referring to FIG. 3, a voice control system 30 includes the voice control apparatus 100, at least one electronic apparatus 200 (for clarity of the description, only one electronic apparatus 200 is illustrated in FIG. 3) and the user apparatus 300. The voice control system 30 is similar to the voice control system 10 of FIG. 1, and thus descriptions related to identical or similar parts are not repeated hereinafter.

In the present embodiment, the storage unit 120 of the voice control apparatus 100 is further configured to record a system voice input module 126 and a system voice output module 128, each of which is, for example, a program stored in the storage unit 120, so that the processing unit 130 of the voice control apparatus 100 may load and execute the system voice input module 126 and the system voice output module 128 in order to bridge for a voice data transmission between the voice communication module 122 and the voice assistant module 124.

To be specific, the voice communication module 122 is capable of receiving the voice data through the Internet and providing the voice data to the system voice input module 126. The system voice input module 126 is capable of converting format of the voice data and providing the format-converted voice data to the voice assistant module 124. Taking an example in which what received by the voice communication module 122 is the voice data based on VoIP, the system voice input module 126 converts the voice data based on VoIP into, for example, voice data with a system voice input specification to be provided to the voice assistant module 124 for the voice recognition.

After the voice recognition performed for the voice data by the voice assistant module 124 is completed, the voice assistant module 124 may obtain the control command, generate the voice response message, and provide the voice response message to the system voice output module 128. The system voice output module 128 is capable of converting format of the voice response message and providing the format-converted voice response message to the voice communication module 122. Aforementioned voice response message includes, for example, a system voice output specification, so that the system voice output module 128 may convert the voice response message with the system voice output specification into the voice response message based on VoIP in order to provide the voice response message to the voice communication module 122 and then transmit the voice response message to the user apparatus 300 by the voice communication module 122 through the Internet.

It is worth mentioning that, the voice recognition for voice data is performed only by the voice control apparatus 100 in the embodiments of the invention, whereas the user apparatus 300 does not need to execute the voice recognition. Therefore, a design of the user apparatus 300 may be simplified since it is not required to specially dispose processors with powerful computation capability and the voice database recording a large amount of the preset audio signals on the user apparatus 300. Moreover, when the VoIP technology is used for transmitting voices, the problem of network connection blocked by firewall and network setting on the network may also be solved.

Further, considering safety issue of the remote voice control function and accuracy of the voice recognition, in some embodiments, the voice assistant module 124 may also confirm identity of the user through a voice print recognition, and provide an individual voice database to compare the control command for the user. Accordingly, accuracy of the recognition for the control command may be prevented from being affected by different accents or speech habits of the users.

Figure 4:
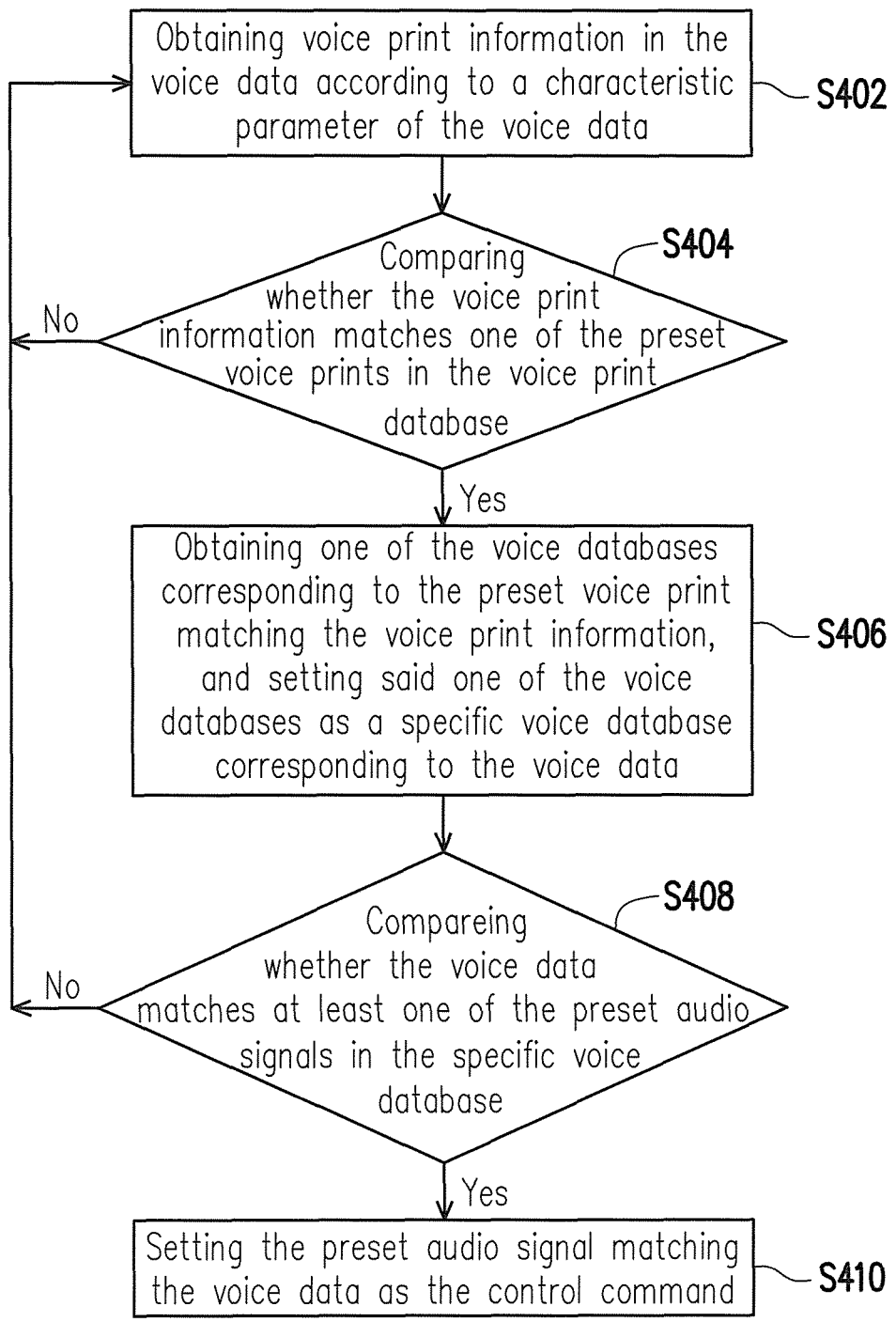
FIG. 4 is a flowchart illustrating a voice control method according to one embodiment of the invention.

An embodiment is provided below for further description. FIG. 4 is a flowchart illustrating a voice control method according to one embodiment of the invention, which illustrates detailed steps of the voice recognition executed for the voice data by the voice assistant module 124. The present embodiment is adapted to the voice control system 10 of FIG. 1, and the difference from the foregoing embodiment is that, the voice control apparatus 100 of the present embodiment further includes a voice print database and a plurality of voice databases, which may be recorded in the storage unit 120. Herein, the voice print database may record a plurality of preset voice prints which are corresponding to the voice databases respectively, and each of the voice databases may record a plurality of preset audio signals.

Referring to FIG. 4, in step S402, the voice assistant module 124 obtains voice print information in the voice data according to a characteristic parameter of the voice data. For example, the voice assistant module 124 may retrieve the characteristic parameter of the voice data to serve as the voice print information through computation such as Linear Prediction Coefficient (LPC), Mel-frequency Cepstral Coefficient (MFCC) and the like.

In step S404, the voice assistant module 124 compares whether the voice print information matches one of the preset voice prints in the voice print database. If yes, the voice assistant module 124 determines that such voice print information is corresponding to the legitimate user. Then, in step S406, the voice assistant module 124 obtains one of the voice databases corresponding to the preset voice print matching the voice print information and sets said one of the voice databases as a specific voice database corresponding to the voice data. If no, the voice assistant module 124 may determine that such voice print information does not have the permission to access the voice control apparatus 100. As such, no further process is performed for such voice data and the method goes back step S402 for receiving the voice data again.

Next, in step S408, the voice assistant module 124 compares whether the voice data matches at least one of the preset audio signals in the specific voice database. If yes, in step S410, the voice assistant module 124 sets the preset audio signal matching the voice data as a control command. If no, the voice assistant module 124 may determine that the control command in the voice data is not the control command with the permission. As such, the control command will not be executed, and the method goes back to step S402.

It is worth mentioning that, in an embodiment, the voice control apparatus 100 may also provide a machine learning mechanism, so that the specific voice database may be updated according to an input operation of the user. For example, when the user apparatus 300 receives the voice response message transmitted back from the voice control apparatus 100, the user apparatus 300 may also provide, for example, an input interface so that the user is able to feedback corrections and opinions regarding the voice recognition result by, for example, text input. In this way, the voice control apparatus 100 may adjust the acoustic model and/or the language model in the specific voice database through data training, so as to optimize accuracy of the voice recognition for the user.

Description regarding how the voice control apparatus realizes the control setting based on safety issue by utilizing parameters such as the voice print information, a prompt command and environment information is provided as follows.

Figure 5:
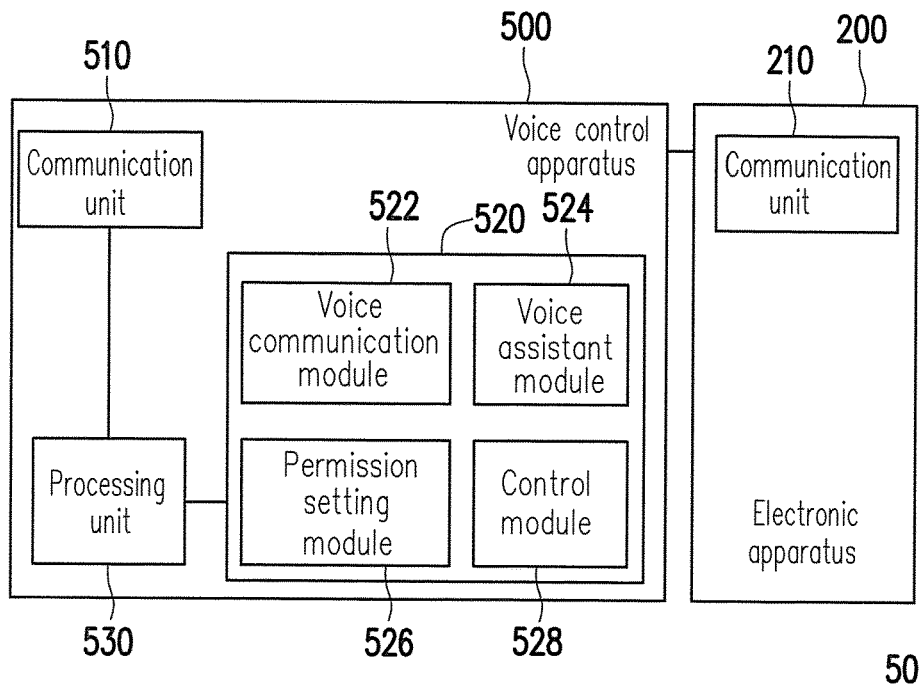
FIG. 5 is a block diagram illustrating a voice control system according to one embodiment of the invention.

FIG. 5 is a schematic diagram illustrating a voice control system according to one embodiment of the invention. Referring to FIG. 5, a voice control system 50 includes a voice control apparatus 500 and at least one electronic apparatus 200 (for clarity of the description, only one electronic apparatus 200 is illustrated in FIG. 5). The voice control apparatus 500 includes a communication unit 510, a storage unit 520 and a processing unit 530. The storage unit 520 is configured to record a voice communication module 522, a voice assistant module 524, a permission setting module 526 and a control module 528, which are programs stored in the storage unit 520, for example. These programs may be loaded into the processing unit 530 of the voice control apparatus 500 so that the processing unit 530 may execute functions including voice recognition, setting and controlling the permissions. Moreover, the electronic apparatus 200 includes a communication unit 210, a storage unit (not illustrated) and a processing unit (not illustrated). Elements in the present embodiment are similar to those in the aforementioned embodiment, and thus descriptions related to identical or similar parts are not repeated hereinafter.

In detail, the voice communication module 522 is capable of receiving the voice data. In the present embodiment, the voice communication module 522 may receive a voice signal sent by the user directly through a voice receiving apparatus (e.g., a microphone or other voice receivers), and then the voice communication module 522 may perform a digitalizing process for the voice signal in order to obtain voice data. In other words, in the present embodiment, the user and the voice control apparatus 500 are located in the same space (e.g., the same room, the same conference room, etc.). In other embodiments, the voice communication module 522 may also receive the voice data from a user apparatus (for example, the user apparatus 300 in the embodiment of FIG. 1) through the Internet, and the voice data may be voice data based on VoIP. Detailed implementation of this part is similar to that of the aforementioned embodiment, which is not repeated hereinafter.

The voice assistant module 524 may execute a voice recognition for the voice data in order to obtain voice print information and a prompt command corresponding to the voice data. For example, the voice assistant module 524 may obtain the voice print information by extracting a characteristic parameter from the voice data, which may be used to confirm identity of the user. Moreover, the voice assistant module 524 may obtain the prompt command by comparing the voice data with the voice database. In the present embodiment, the prompt command includes, for example, location info' illation containing words like "not home" or "at home", which may be recorded as the user state. Detailed process of the voice assistant module 524 for executing the voice recognition for the voice data in order to obtain the voice print information and the prompt command corresponding to the voice data may be refer to the similar detailed process provided in the embodiment of FIG. 4.

The permission setting module 526 may determine permission information corresponding to the voice print information according to the voice print information and the prompt command. To be specific, the permission setting module 526 may set different permission levels for different users (which are corresponding to different voice print information). These permission levels may be used to determine an apparatus amount, a function amount or a combination thereof for the electronic apparatuses 200 controlled by the voice print information (corresponding to the user), and may be stored in a manner of lookup table in the storage unit 520.

The control module 528 may control the electronic apparatus 200 through the local area network according to at least one of the permission information, the prompt command and the environment information. In other words, in the present embodiment, multiple usage scenarios may be set through a combination of the permission information and the environment information, so that the control module 528 may control the electronic apparatuses 200 according to the different scenarios.

For example, when the voice control system 50 includes one electronic apparatus 200, whether the permission level is high or low may be used to determine the function amount of the electronic apparatuses 200 controllable by the voice print information. In the case where the voice control system 50 includes a plurality of electronic apparatuses 200, whether the permission level is high or low may also be used to determine the apparatus amount of the electronic apparatuses 200 controllable by the voice print information in the voice control system 50 in addition to the function amount of the each of the electronic apparatuses 200 controllable by the voice print information in the voice control system 50. From another perspective, a capability of the voice data corresponding to the voice print info illation for controlling the voice control system 50 is stronger when the permission level is higher, whereas the capability of the voice data corresponding to the voice print information for controlling the voice control system 50 is limited when the permission level is lower.

Therefore, in the present embodiment, when the voice assistant module 524 obtains the voice print information, the permission setting module 526 may search the database according to the voice print information, so as to select one of the permission levels to serve as the permission information corresponding to the voice print information. Moreover, the permission setting module 526 may also adaptively increase or decrease the permission level of the permission information according to whether the prompt command includes location information of the user.

Figure 6:
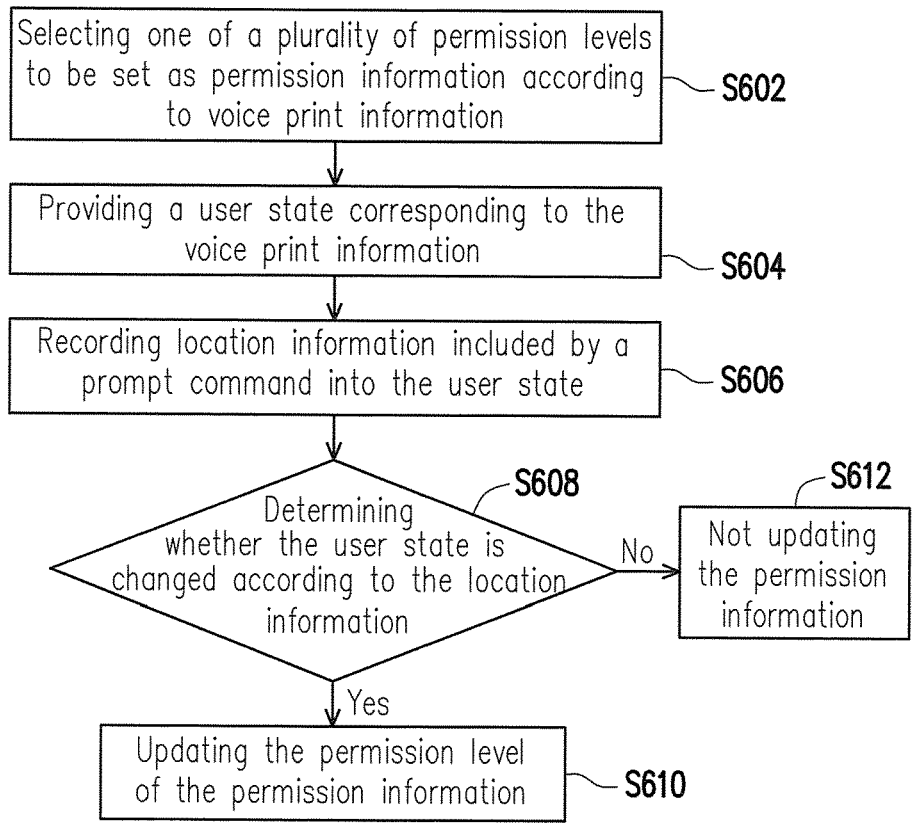
FIG. 6 is a flowchart illustrating a voice control method according to one embodiment of the invention.

Hereinafter, detailed steps for determining the permission information are described with reference to the embodiment of FIG. 6. FIG. 6 is a flowchart illustrating a voice control method according to one embodiment of the invention, and the voice control method is adapted to the voice control system 50 of FIG. 5.

Referring to FIG. 6, in step S602, the permission setting module 526 selects one of a plurality of permission levels to be set as the permission information according to the voice print information. In other words, the permission setting module 526 may first look up the preset permission level corresponding to the voice print information from the database, and set the same as the current permission information.

In step S604, the permission setting module 526 provides a user state corresponding to the voice print information. The user state is, for example, recorded in the storage unit 520, or may also be recorded in other registers.

Then, in step S606, the permission setting module 526 records the location information included by the prompt command into the user state. Specifically, the permission setting module 526 may determine whether the prompt command includes the location information, and the permission setting module 526 may record the location information into the user state when the prompt command includes the location information. The location information may include, for example, specific words such as "not home" or "at home" as mentioned above.

Then, in step S608, the permission setting module 526 determines whether the user state is changed according to the location information. When the user state is changed according to the location information, in step S610, the permission setting module 526 updates the permission level of the permission information. The action of updating the permission information includes, for example, adjusting the permission information into another one of the permission levels by the permission setting module 526 according to the user state.

On the other hand, if the user state is not changed, the method goes to step S612 in which the permission setting module 526 does not update the permission information.

For example, when the voice communication module 522 receives the voice data of a legitimate user through a voice receiving unit of the voice control apparatus 500, the permission setting module 526 may search the corresponding permission information according to the voice print information of the user. Moreover, the permission setting module 526 may also preset the user state corresponding to the voice print information to be "at home". When the permission setting module 526 determines that the prompt command includes "not home" or other location information different to "at home", the permission setting module 526 may record said location information (e.g., "not home") into the user state. In this case, since the user state is changed because of the location information, the permission setting module 526 may adjust the permission level of the permission information. When the user state is switched from "at home" into "not home", the permission setting module 526 decreases the permission level of the permission information, for example. On the other hand, when the prompt command does not include the location information or when the prompt command includes only the location information of "at home", the permission setting module 526 does not change the user state. Therefore, the permission information is not updated/adjusted, and instead, the current permission level is set as the permission information corresponding to the voice print information.

In this way, the present embodiment allows the user to inform the voice control apparatus 500 of the user state (whether the user is at home or not) in manner of voice control, so that the voice control apparatus 500 may determine whether to adjust the permission level of the permission information according to the user state. From another perspective, in the present embodiment, the access permission and the operation mode of the user (who is not home) to control the voice control apparatus 500 may be limited by adjusting the permission information.

In another embodiment, when the voice control apparatus 500 receives the voice data from multiple users, if it is determined that the user with high access permission is at home, the permission setting module 526 may correspondingly increase the permission level of the permission information corresponding to the user with low access permission.

Herein, an example is taken in which the voice control apparatus 500 respectively receives first voice data of a first user and a second voice data of a second user. If the first user and the second user are both the legitimate users, and the permission level of the permission information corresponding to the first user is higher than that of the second user, when the permission setting module 526 determines that a first prompt command includes the word "at home", the permission setting module 526 may record "at home" into the user state of the first user and increase the permission level of the permission information of the second user (e.g., increasing the function amount of the electronic apparatus 200 controllable by the second user through voice control).

Figure 7:
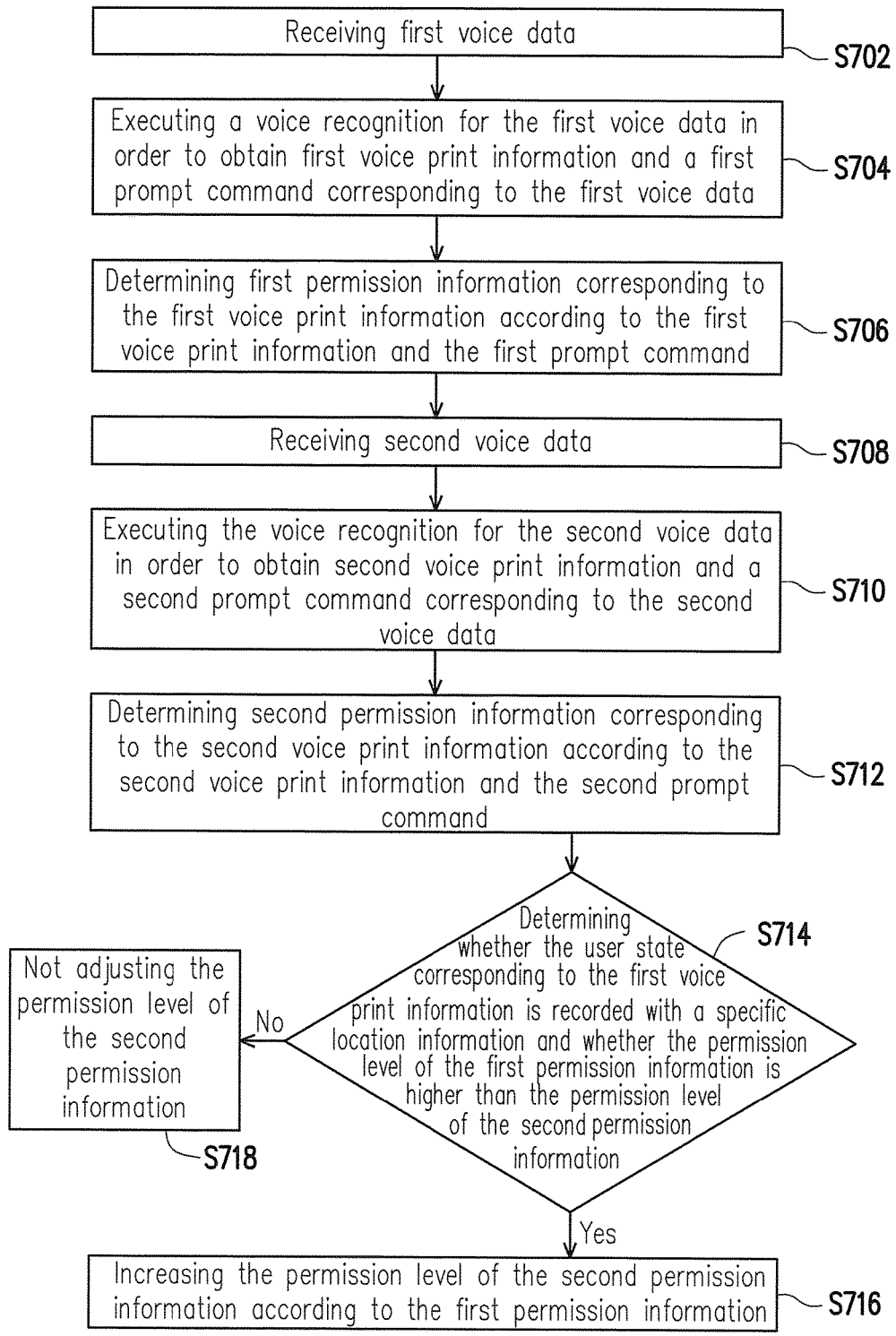
FIG. 7 is a flowchart illustrating a voice control method according to one embodiment of the invention.

Aforementioned scenario may be represented by a flowchart in FIG. 7. FIG. 7 is a flowchart illustrating a voice control method according to one embodiment of the invention, which is adapted to the voice control system 50 of FIG. 5.

Referring to FIG. 7, in step S702, the voice communication module 522 receives first voice data. In step S704, the voice assistant module 524 executes a voice recognition for the first voice data in order to obtain first voice print information and a first prompt command corresponding to the first voice data. In step S706, the permission setting module 526 determines first permission information corresponding to the first voice print information according to the first voice print information and the first prompt command. Moreover, in step S708, the voice communication module 522 receives second voice data. In step S710, the voice assistant module 524 executes the voice recognition for the second voice data in order to obtain second voice print information and a second prompt command corresponding to the second voice data. Herein, the second voice print information is different from the first voice print information. In step S712, the permission setting module 526 determines second permission information corresponding to the second voice print information according to the second voice print information and the second prompt command.

Implementations regarding the steps for determining the first permission information (i.e. steps S702, S704, S706) and the steps for determining the second permission information (i.e. steps S708, S710, S712) may refer to the same as described in detail in the foregoing embodiments. Further, it is worth mentioning that, an execution sequence of the steps for determining the first permission information and the steps for determining the second permission information may be determined based on practical requirements. For example, the steps S708, S710, S712 may be executed while or before executing the steps S702, S704, S706, which are not particularly limited by the invention.

Then, in step S714, the permission setting module 526 determines whether the user state corresponding to the first voice print information is recorded with a specific location information and whether the permission level of the first permission information is higher than the permission level of the second permission information. When the user state corresponding to the first voice print information is recorded with the specific location information and the permission level of the first permission information is higher than the permission level of the second permission information, in step S716, the permission setting module 526 increases the permission level of the second permission information according to the first permission information. If the determination result of the step S714 is no, in step S718, the permission setting module 526 does not adjust the permission level of the second permission information.

In another embodiment, in case the user intends to control a specific electronic apparatus (e.g., a specific home appliance), that is, when it is recognized that the prompt command includes one specific electronic apparatus 200, the voice control apparatus 500 may further remind the user with a highest permission level of the same. To be specific, the control module 528 may determine whether the prompt command includes apparatus information of the electronic apparatus 200 (e.g., a name of the electronic apparatus 200). If yes, the control module 528 may search for a specific voice print corresponding to the highest permission level among the preset voice prints, and transmit a prompt message to the user corresponding to the specific voice print. The prompt message may be received by, for example, the user apparatus registered by the user corresponding to the specific voice print. Alternatively, when the control module 528 determines that the user and the voice control apparatus 500 are located within the same space, the control module 528 may also directly control an output unit of the apparatus (e.g., a speaker, a screen, a LED light, etc.) to prompt the user. A presenting manner of the prompt message e is not particularly limited by the invention.

Moreover, in other embodiments, the voice control apparatus 500 may also determine a control mode of the voice control apparatus 500 for the electronic apparatus 200 according to the environment information. The environment information may include time information, which is, for example, a time interval or a specific time point.

For example, an automatic operation mode of the voice control apparatus 500 includes: when all the legitimate users granted access to the voice control apparatus 500 are not home, the voice control apparatus 500 will automatically turn on the light of the entrance at 6 PM. The control module 528 may continuously detect the time and determine whether none of the user states corresponding to all the legitimate users granted access to the voice control apparatus 500 is recorded with the location information of "at home" at the 6 PM. If none of them is recorded with the location information of "at home", the control module 528 will determine that all these users are not home and execute the automatic operation of turning on the light of the entrance.

Figure 8:
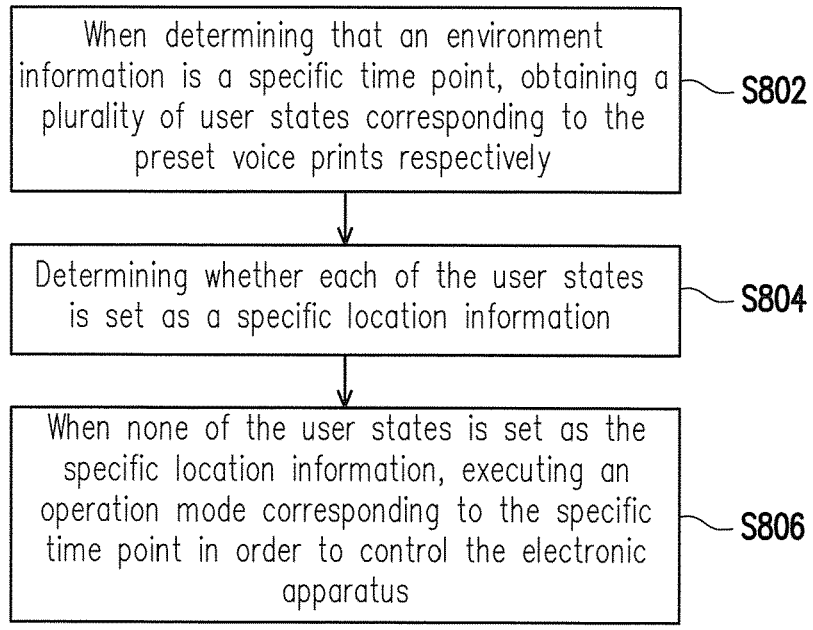
FIG. 8 is a flowchart illustrating a voice control method according to one embodiment of the invention.

The aforementioned scenario may be represented by a flowchart of FIG. 8. FIG. 8 is a flowchart illustrating a voice control method according to one embodiment of the invention, which is adapted to the voice control system 50 of FIG. 5.

Referring to FIG. 8, in step S802, when determining that the environment information is a specific time point, the control module 528 obtains a plurality of user states corresponding to the preset voice prints respectively. In step S804, the control module 528 determines whether each of the user states is set as a specific location information. When none of the user states is set as a specific location information, in step S806, the control module 528 executes an operation mode corresponding to the specific time point in order to control the electronic apparatus 200.

In another example, the voice control apparatus 500 may be disposed in a conference room. The voice control apparatus 500 may provide the voice control function for allowing the user to control a projector or an audio output equipment in the conference room and limiting said voice control function from being used by the user at the lunch break. For example, the user is allowed to adjust an output volume (within an intensity interval) of a common audio output equipment. However, at the lunch break, the user is limited and is only able to control the output volume to be equal to below half the maximum intensity of aforesaid intensity interval, for example. On the other hand, for the users having different permission information, at the lunch break, the voice control apparatus 500 may selectively forbid the user with lower permission level from operate all functions of the projector and the audio output equipment at the lunch break.

In other words, the control module 528 in the aforesaid example may detect whether the environment information matches a specific time interval (e.g., the aforementioned lunch break), and the control module 528 may limit the voice data from controlling the electronic apparatus 200 according to the permission information when the environment information matches the specific time interval.

Figure 9:
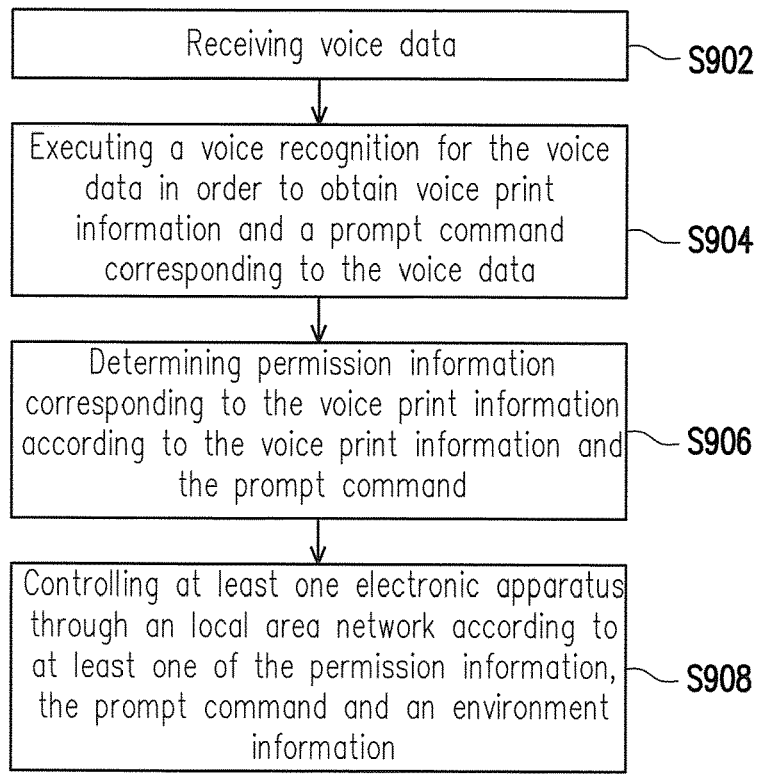
FIG. 9 is a flowchart illustrating a voice control method according to one embodiment of the invention.

Based on the foregoing embodiments, a voice control method is further provided according to the embodiments of the invention. Referring to FIG. 9, FIG. 9 is a flowchart illustrating a voice control method according to one embodiment of the invention, which is adapted to the voice control system 50 of FIG. 5. In step S902, the voice communication module 522 receives voice data. In step S904, the voice assistant module 524 executes a voice recognition for the voice data in order to obtain voice print information and a prompt command corresponding to the voice data. In step S906, the permission setting module 526 determines permission information corresponding to the voice print information according to the voice print information and the prompt command. In step S908, the control module 528 controls the electronic apparatus 200 through the local area network according to at least one of the permission information, the prompt command and the environment information.

In summary, in the embodiments of the invention, based on a plurality of parameters such as the voice print recognition, access permission setting, user states and environment information, a control setting based on safety issue is implemented under a plurality of scenarios, for example, to limit the voice control function provided to the user by the voice control apparatus, or to allow the voice control apparatus to automatically execute a specific operation mode. Moreover, the embodiments of the invention further provide a remote voice control function. In this way, both of the operation convenience and safety issue of the smart home service are optimized.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A voice control method, adapted to a voice control apparatus connected to a local area network, the voice control method comprising:

receiving a first voice data;

executing a voice recognition for the first voice data in order to obtain a first voice print information and a first prompt command corresponding to the first voice data;

determining a first permission information corresponding to the first voice print information according to the first voice print information and the first prompt command;

controlling at least one electronic apparatus through the local area network according to at least one of the first permission information, the first prompt command and an environment information;

limiting the first voice data from controlling the at least one electronic apparatus according to the first permission information when the environment information matches a specific time interval of a day;

receiving a second voice data;

executing the voice recognition for the second voice data to obtain a second voice print information and a second prompt command corresponding to the second voice data, wherein the second voice print information is different from the first voice print information;

determining a second permission information corresponding to the second voice print information according to the second voice print information and the second prompt command; and increasing a permission level of the second permission information according to the first permission information when a user state corresponding to the first voice print information is recorded with a specific location information and the first permission information is higher than the second permission information, wherein at least one of the first voice data and the second voice data are voice data received from a remote apparatus based on a Voice over Internet Protocol technology.

2. The voice control method as claimed in claim 1, wherein the step of determining the first permission information corresponding to the first voice print information according to the first voice print information and the first prompt command comprises:

selecting one of a plurality of permission levels to be set as the first permission information according to the first voice print information;

providing a user state corresponding to the first voice print information;

recording a location information included by the first prompt command into the user state; and updating the permission level of the first permission information when the user state is changed according to the location information.

3. The voice control method as claimed in claim 2, wherein the step of recording the location information included by the first prompt command into the user state comprises:

determining whether the first prompt command comprises the location information; and recording the location information into the user state when the first prompt command comprises the location information.

4. The voice control method as claimed in claim 2, wherein the step of updating the permission level of the first permission information when the user state is changed according to the location information comprises:

adjusting the first permission information into another one of the permission levels according to the user state.

5. The voice control method as claimed in claim 2, wherein the permission level of the first permission information is used to determine an apparatus amount, a function amount or a combination thereof for the at least one electronic apparatus controlled by the first voice print information.

6. The voice control method as claimed in claim 2, wherein the step of controlling the at least one electronic apparatus through the local area network according to at least one of the first permission information, the first prompt command and the environment information comprises:

limiting the first voice data from controlling the at least one electronic apparatus according to the first permission information when the environment information matches a specific time interval.

7. The voice control method as claimed in claim 1, wherein the voice control apparatus comprises a voice print database and a plurality of voice databases, the voice print database records a plurality of preset voice prints corresponding to the voice databases respectively, each of the voice databases records a plurality of preset audio signals, and the step of executing the voice recognition for the first voice data in order to obtain the first voice print information and the first prompt command corresponding to the first voice data comprises:

obtaining the first voice print information in the first voice data according to a characteristic parameter of the first voice data;

comparing whether the first voice print information matches one of the preset voice prints in the voice print database; and if yes, obtaining one of the voice databases corresponding to the preset voice print matching the first voice print information and setting said one of voice databases as a specific voice database corresponding to the first voice data;

comparing whether the first voice data matches at least one of the preset audio signals in the specific voice database; and if yes, setting the preset audio signal matching the first voice data as the first prompt command.

8. The voice control method as claimed in claim 7, further comprising:

updating the specific voice database according to an input operation.

9. The voice control method as claimed in claim 1, wherein the voice control apparatus comprises a voice print database, and the voice print database records a plurality of preset voice prints, and the voice control method further comprises:

determining whether the first prompt command comprises an apparatus information of the at least one electronic apparatus; and searching for a specific voice print corresponding to the highest permission level among the preset voice prints when the first prompt command comprises the apparatus information, and transmitting a prompt message to a user corresponding to the specific voice print.

10. The voice control method as claimed in claim 1, wherein the voice control apparatus comprises a voice print database, the voice print database records a plurality of preset voice prints, and the step of controlling the at least one electronic apparatus through the local area network according to at least one of the first permission information, the first prompt command and the environment information comprises:

obtaining a plurality of user states corresponding to the preset voice prints respectively when the environment information is determined to be a specific time point;

determining whether each of the user states is set as a specific location information; and executing an operation mode corresponding to the specific time point to control the at least one electronic apparatus when none of the user states is set as the specific location information.

11. A voice control system, comprising:
at least one electronic apparatus, comprising:
a first communication unit, connected to a local area network; and
a voice control apparatus, comprising:
a second communication unit, connected to the local area network;
a storage unit, recording a plurality of modules; and
a processing unit, coupled to the second communication unit and the storage unit, and configured to access and execute the modules recorded in the storage unit, the modules comprise:
a voice communication module, receiving voice data;

a voice assistant module, executing a voice recognition for the voice data to obtain voice print information comprising a first voice print information and a prompt command corresponding to the voice data;

a permission setting module, determining a permission information comprising a first permission information and a second permission information corresponding to the voice print information according to the voice print information and the prompt command, and increasing a permission level of the second permission information according to the first permission information when a user state corresponding to the first voice print information is recorded with a specific location information and the first permission information is higher than the second permission information; and a control module, controlling the at least one electronic apparatus through the local area network according to at least one of the permission information, the prompt command and an environment information, and limiting the voice data from controlling the at least one electronic apparatus according to the first permission information when the environment information matches a specific time interval of a day, wherein the voice data is received from a remote apparatus based on a Voice over Internet Protocol technology.

* * * * *